United States Patent [19]

Pearlman et al.

[11] Patent Number: 5,059,871

[45] Date of Patent: Oct. 22, 1991

[54] PROGRAMMABLE LIGHTING CONTROL SYSTEM LINKED BY A LOCAL AREA NETWORK

[75] Inventors: Gordon W. Pearlman; Steven B. Carlson, both of Portland, Oreg.

[73] Assignee: Lightolier Incorporated, Jersey City, N.J.

[21] Appl. No.: 550,176

[22] Filed: Jul. 9, 1990

[51] Int. Cl.$^5$ ............................................. H05B 37/00
[52] U.S. Cl. ..................................... 315/316; 315/312
[58] Field of Search ............... 315/312, 313, 318, 319, 315/316, 317

[56] References Cited

U.S. PATENT DOCUMENTS

| | | | |
|---|---|---|---|
| 3,706,914 | 12/1972 | Van Buren | 315/291 X |
| 4,649,323 | 3/1987 | Pearlman et al. | 315/307 |
| 4,733,138 | 3/1988 | Pearlman et al. | 315/307 |
| 4,792,731 | 12/1988 | Pearlman et al. | 315/316 |

Primary Examiner—David Mis
Attorney, Agent, or Firm—Chernoff, Vilhauer, McClung & Stenzel

[57] ABSTRACT

A lighting control system includes a plurality of lighting control modules where each module includes function switches for generating command signals to control light intensity levels to run a plurality of lighting channels connected thereto. A programmable central processing unit transmits the command signals and also generates an ID code indicating a unique identity for each. The light control modules are interconnected on a local area network for carrying the ID codes and the command signals. Each of the lighting control modules is programmable for selecting predetermined ID codes whereby command signals generated by selected control modules may be executed by other control modules.

8 Claims, 13 Drawing Sheets

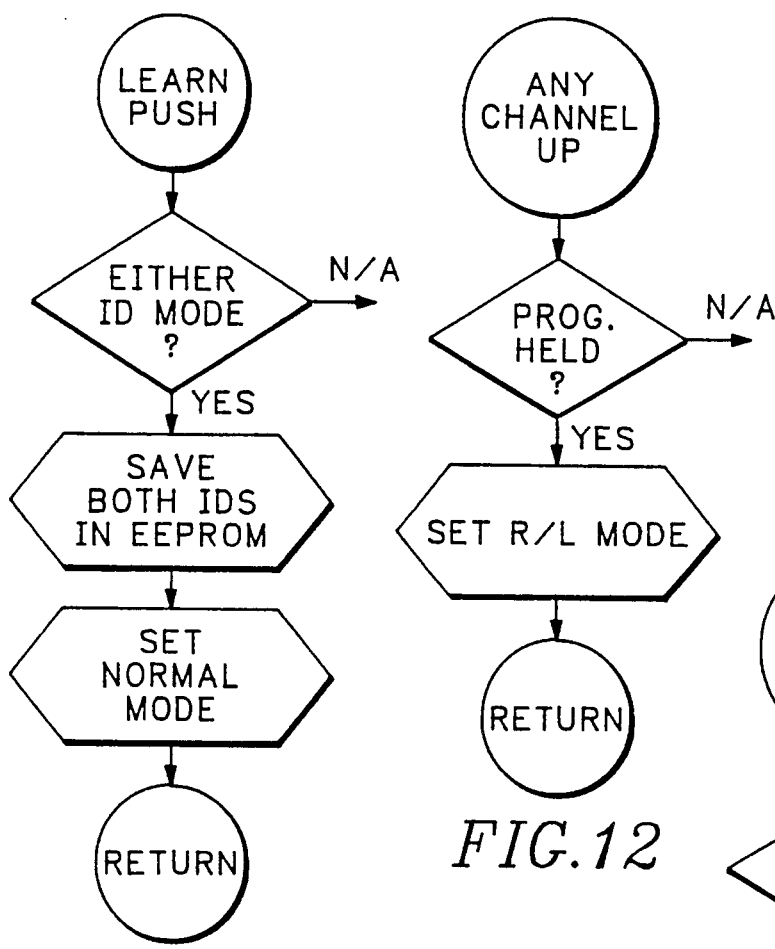
FIG.11
FIG.12
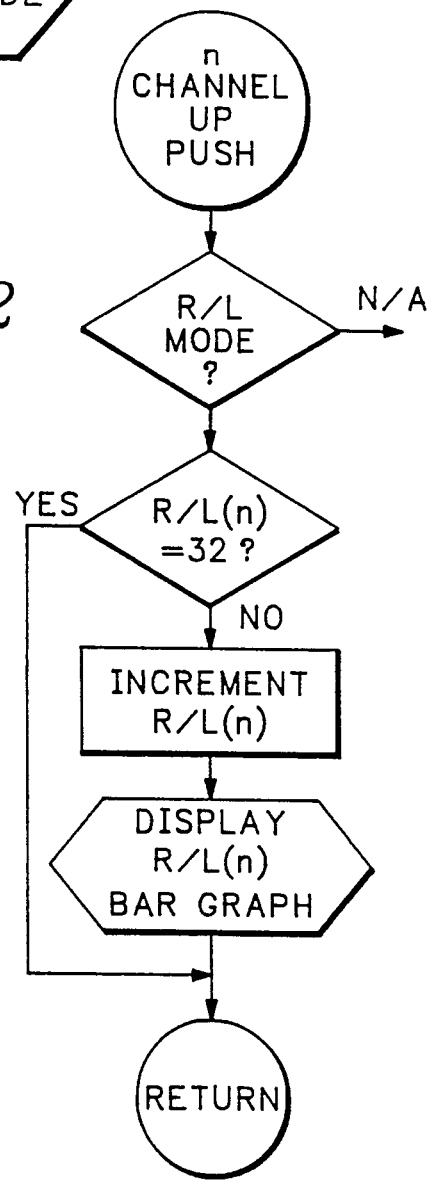
FIG.13

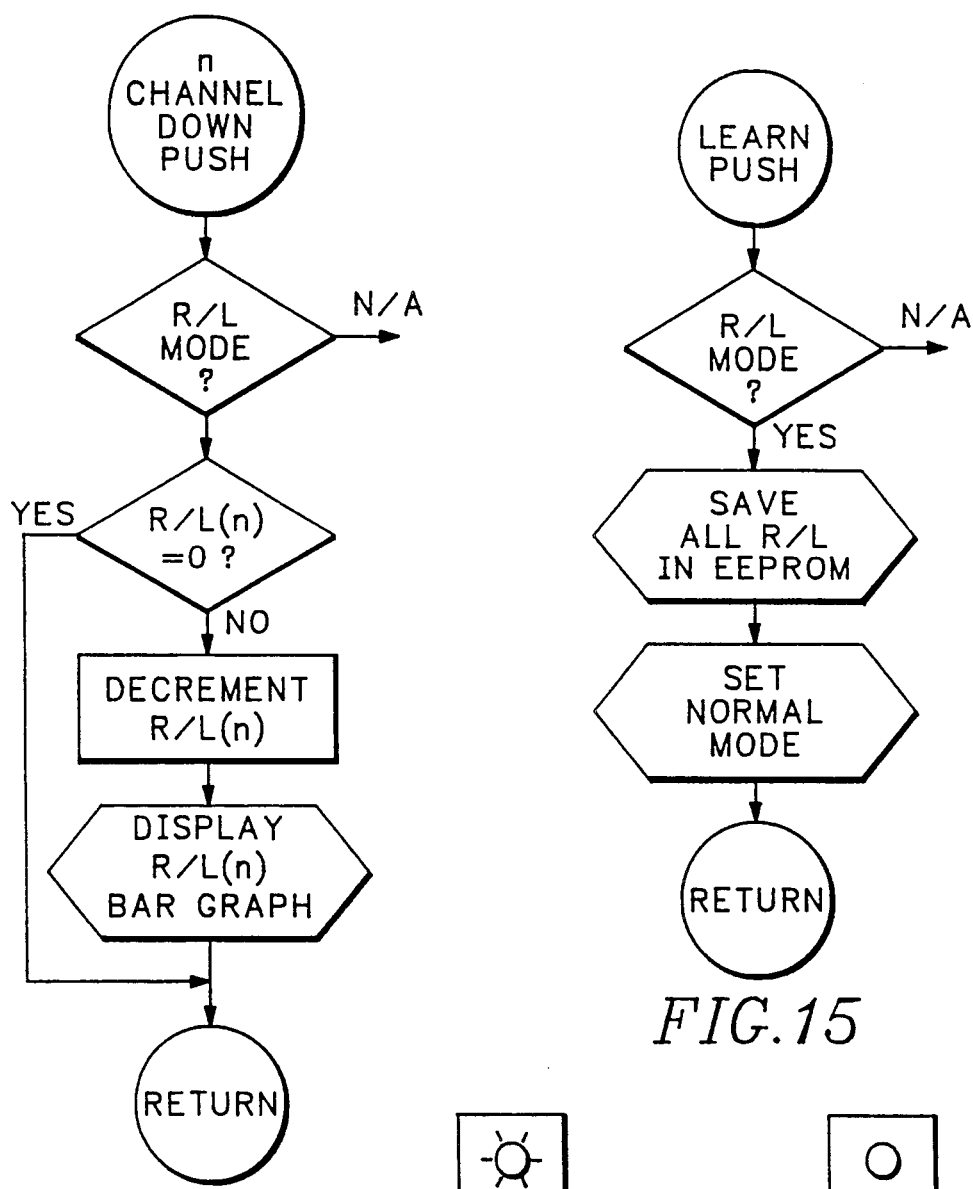
FIG.14
FIG.15
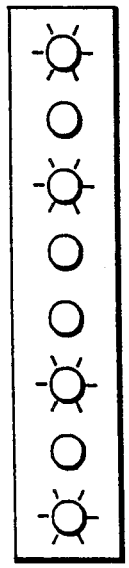
FIG.16
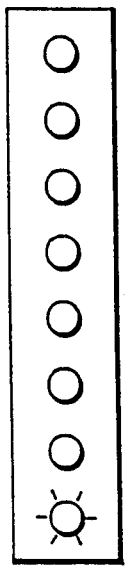
FIG.17

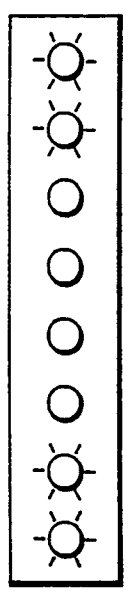
*FIG. 24*
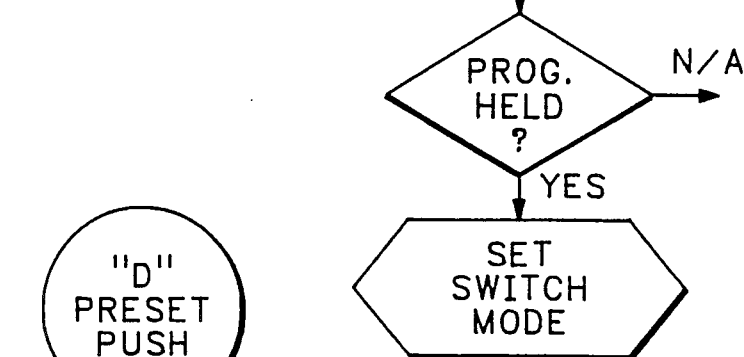
*FIG. 25*
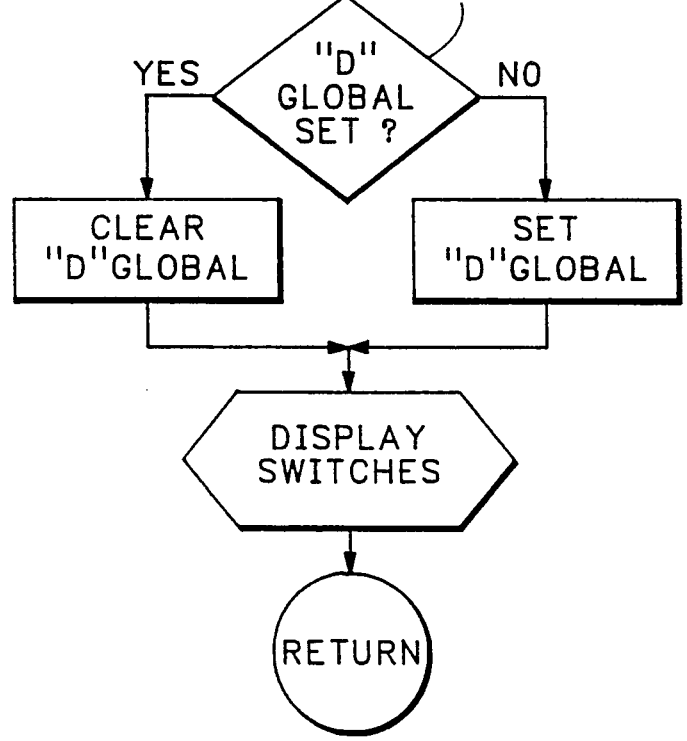
*FIG. 26*

FIG. 30

PROGRAMMABLE LIGHTING CONTROL SYSTEM LINKED BY A LOCAL AREA NETWORK

BACKGROUND OF THE INVENTION

The present invention relates to a lighting control system for residences and the like which includes a plurality of programmable lighting control modules and remote function switches linked together on a local area network.

Home lighting systems which are prewired into dwellings during the construction phase are becoming increasingly sophisticated. The single circuit mechanical light switch has been replaced by multichannel touch sensitive controllers which can control a plurality of lighting channels and which can provide dimming for selected channels so that a user can customize the lighting in a particular room from a single control panel. Systems of this type are disclosed in U.S. Pat. No. 4,649,323 issued Mar. 10, 1987 entitled MICROCOMPUER-CONTROLLED LIGHT SWITCH and in U.S. Pat. No. 4,733,138 issued Mar. 22, 1988 entitled PROGRAMMABLE MULTICIRCUIT WALL-MOUNTED CONTROLLER. Not only may individual channels be controlled with the controllers described in the aforementioned U.S. Pat. Nos., but lighting levels for groups of channels may be stored in memory as preset levels which may be retrieved by the push of a single switch. These controllers are typically wired to control the lighting circuits in a single room or area.

It is also possible to link a plurality of lighting level controllers to a single central processing unit which includes a computer. The computer may be programmed to link several individual light controls in a particular group and place the group under control of a selected individual control within the group. Such a system is shown in U.S. Pat. No. 4,792,731 issued Dec. 20, 1988 entitled MULTI-ROOM CONTROLLER FOR INDIVIDUAL LIGHT CONTROLS. The system of this patent includes a centrally located control panel which may be used to control the various individual room or area lighting controls and group them as desired. A drawback of this design is that all programming must be accomplished at the central control unit. If the central control unit experiences a failure, the entire lighting system fails because all of the individual lighting control units are dependent upon the commands from the central controller in order to function. Also, the remote lighting control units lack the ability to program the central controller or to control each other except through the central controller.

SUMMARY OF THE PRESENT INVENTION

A lighting control system constructed according to the invention includes a plurality of lighting control modules, each module having function switches or buttons for generating command signals to control light intensity levels on a plurality of lighting channels. Each control module includes a programmable central processing unit for transmitting command signals and for generating an ID code indicating a unique identity for each respective lighting control module. All of the lighting control modules are linked together on a local area network so that each time a function switch is pressed on any one of the lighting control modules, both the command signal and the ID code are broadcast on the network to the other control modules. Each lighting control module is programmable so that it may be made to respond to predetermined ID codes to enable certain command signals generated by other lighting control modules to be executed by the programmed control module.

The system, therefore, has the capability for making any of the lighting control modules a "central controller" which can control any of the other lighting control modules. The failure of any particular lighting control module therefore has no effect on the network beyond its immediate local effect, and it may be bypassed or its functions replaced by other lighting control modules.

Also, according to the invention, various types of remote switches may be placed on the local area network and selected lighting control modules may be programmed to respond to these remote switches. One such type of remote unit includes a set of preset switches which can simultaneously adjust lighting levels on a plurality of lighting channels controlled by any particular one or a plurality of lighting control modules. Another type of remote unit is a raise/lower switch which raises or lowers lighting levels on selected channels controlled by particular lighting control modules. For example, a lighting control module which controls the lighting in the entry way of a residence may be programmed to respond to a preset control located in an upstairs bedroom so that all lights in the entryway may be turned on by the upstairs remote. Similarly, other lighting control modules downstairs in the house could be slaved to the same remote causing all the lights downstairs in the residence to come on when this single switch is activated. Similarly, a downstairs remote preset may be selected to control all upstairs lighting levels so that all lights may be turned off when leaving the house by activating this single switch. Each of the remote switch types also generates a unique identity code and a command code each time one of its function switches is depressed. Whether or not any particular lighting control module responds depends on whether it has been so programmed.

Each lighting control module includes a plurality of front panel function switches for selected presets, and raise/lower switches. For each of the individual channels, the light intensity level on each individual channel may be represented by an illuminated bar graph comprising a column of LEDs. A special programming switch associated with each lighting control module may be used to place the module in a programming mode. In the programming mode the various function switches on the front panel of the lighting control module are used to select different programs to be executed by the central processing unit of the particular lighting control module. Also in the programming mode the individual lighting channel bar graphs are programmed to provide visual feedback indicating the particular program that is being executed. The lighting patterns on the bar graphs ar organized in codes which will be recognizable by the user as providing verification that selected programs have been initiated.

It is a principal object of this invention to provide a lighting control system in which any one of a plurality of lighting control modules may be programmed to accept commands from any of the other lighting control modules and/or remote units over a local area network.

A further object of this invention is to provide a lighting control module for a plurality of lighting channels which has a central processing unit which may be programmed from the module's front panel.

A still further object of this invention is to provide a programmable lighting control module which can provide visual feedback to the user indicating programming functions while in a programming mode.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIGS. 9-11 are flow chart diagrams illustrating a computer program utilizing the channel expander ID setup mode.

FIGS. 12-15 are flow chart diagrams illustrating a computer program utilized in the local area network (LAN) raise/lower setup mode.

FIG. 16 is a front view of the RATE DISPLAY bar graph of a lighting control module illustrating a lighting pattern which indicates that the LAN raise/lower setup mode has been selected.

FIG. 17 is a front view of the RATE DISPLAY bar graph of a lighting control module illustrating the lighting pattern which indicates, in binary form, a LAN preset remote assignment.

FIG. 24 is a front view of the RATE DISPLAY bar graph of a lighting control module illustrating a lighting pattern which indicates that the global preset setup mode has been selected.

FIGS. 25-28 are flow chart diagrams illustrating a computer program utilized in the global preset setup mode.

FIG. 30 illustrates bar graph lighting patterns corresponding in binary format to the numbers 0 through 31.

DETAILED DESCRIPTION OF THE INVENTION

Figure 1:
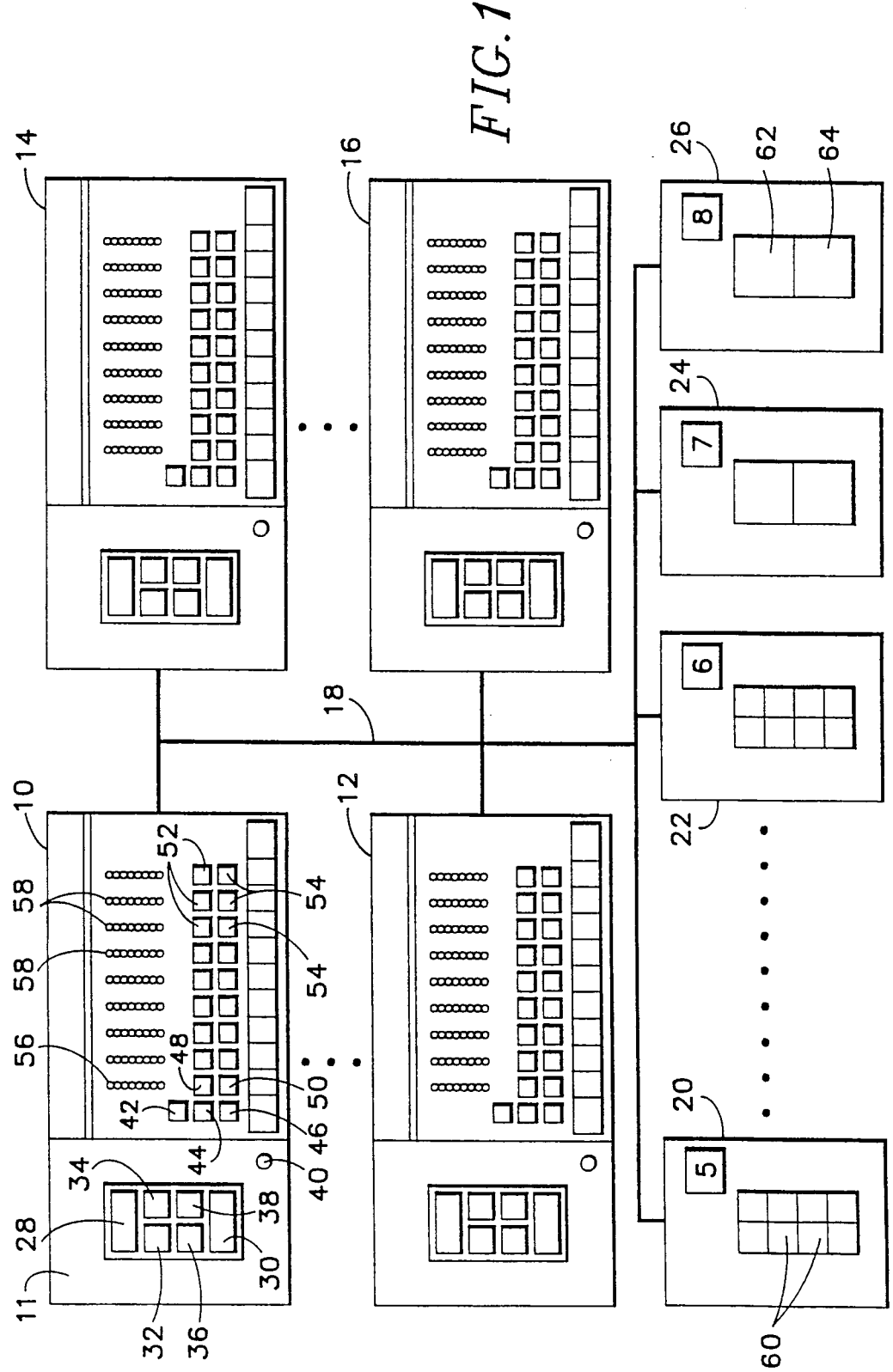
FIG. 1 is a schematic diagram of a lighting control system showing the front panel configurations of the lighting control modules and remote switching units.

A lighting control system interconnected by a local area network is shown in FIG. 1. The system shows four lighting control modules 10, 12, 14 and 16 connected to a bus 18 which may be a single shielded twisted wire pair. The twisted wire pair makes residential installation fairly simple, and continuity problems in bulky ribbon cables are thus avoided. The system also includes two preset remote units 20 and 2 and two raise/lower remote switches 24 and 26. The exact system configuration is up to the user and there may be more lighting control modules if desired, as well as more or fewer preset remote units and raise/lower remote switches. Each of the lighting control modules 10, 12, 14 or 16 is a stand-alone controller having preset, fade rate, raise/lower, and dimming functions included. The unit can control up to sixteen lighting channels in a given space or room without any interaction from other units. This differs from the aforementioned systems which require a central computer which must control all of the individual switching modules.

Each of the lighting control modules such as module 10 includes an ON switch 28, an OFF switch 30 and four preset switches PRESET B 32, PRESET C 34, PRESET D 36 and PRESET E 38. The ON switch 28 doubles as PRESET A. A programming switch 40 is used to place the module 10 in a programming mode as will be explained below. The switch 40 is not normally accessible with the fingertips, but may be pressed by a pencil or other sharp object so that the unit will not inadvertently be placed in a programming mode. If desired the switch 40 may be located behind the front panel 11 which may swing open on a hinge (not shown). A LEARN switch 42 is used after a programming sequence, as will be described below, to save programming data in memory and take the unit 10 out of the programming mode restoring it to normal operation. The front panel of the module 10 also includes a master UP switch 44 and a master DOWN switch 46 that control all channels as well as a rate UP switch 48 and a rate DOWN switch 50 which controls the rate of fade. To the left of the rate UP and DOWN switches 48 and 50 respectively, are individual channel RAISE/LOWER switches 52 and 54.

Visual feedback which indicates the intensity of lighting levels, and the rate at which the lighting levels will fade from one level to another are shown in bar graphs on the front panel of lighting control module 10. Bar graph 56 is the RATE DISPLAY bar graph and all of the other bar graphs 58 to the right of bar graph 56 indicate lighting levels on the various channels controlled by RAISE/LOWER switches 52 and 54. Each bar graph is comprised of eight LEDs which are illuminated incrementally. The lighting control modules 12, 14 and 16 are identical in all respects to lighting control module 10.

The preset remote units such as units 20 and 22 select preset commands corresponding to presets A-E. Each unit has an identification code printed or embossed in its top right hand corner. For example, the identification code of unit 20 is "5" and that of unit 22 is "6." The switches 60 on the front panel of each unit correspond to the various preset commands similar to switches 28, 32, 34, 36 and 38 on lighting control module 10. Presets are collections of commands for lighting levels on several channels which are stored in memory and which can be recalled from memory and executed as a group upon the pressing of the appropriate switch. For example, one preset might call for all light channels to be fully on, another might call for all light channels to be fully off, and yet a third may call for "mood" lighting.

Preset commands and their functions are described in U.S. Pat. No. 4,733,138 mentioned above.

The raise/lower remote switches 24 and 26 provide a raise/lower lighting command for selected channels on any lighting controller that is slaved to it on the local area network. For example, remote raise/lower switch 26 includes a "raise" button 62 and a "lower" button 64. As with the preset remote units 20 and 22, switches 24 and 26 are also assigned ID codes, in this case, ID codes 7 and 8, respectively.

Figure 2:
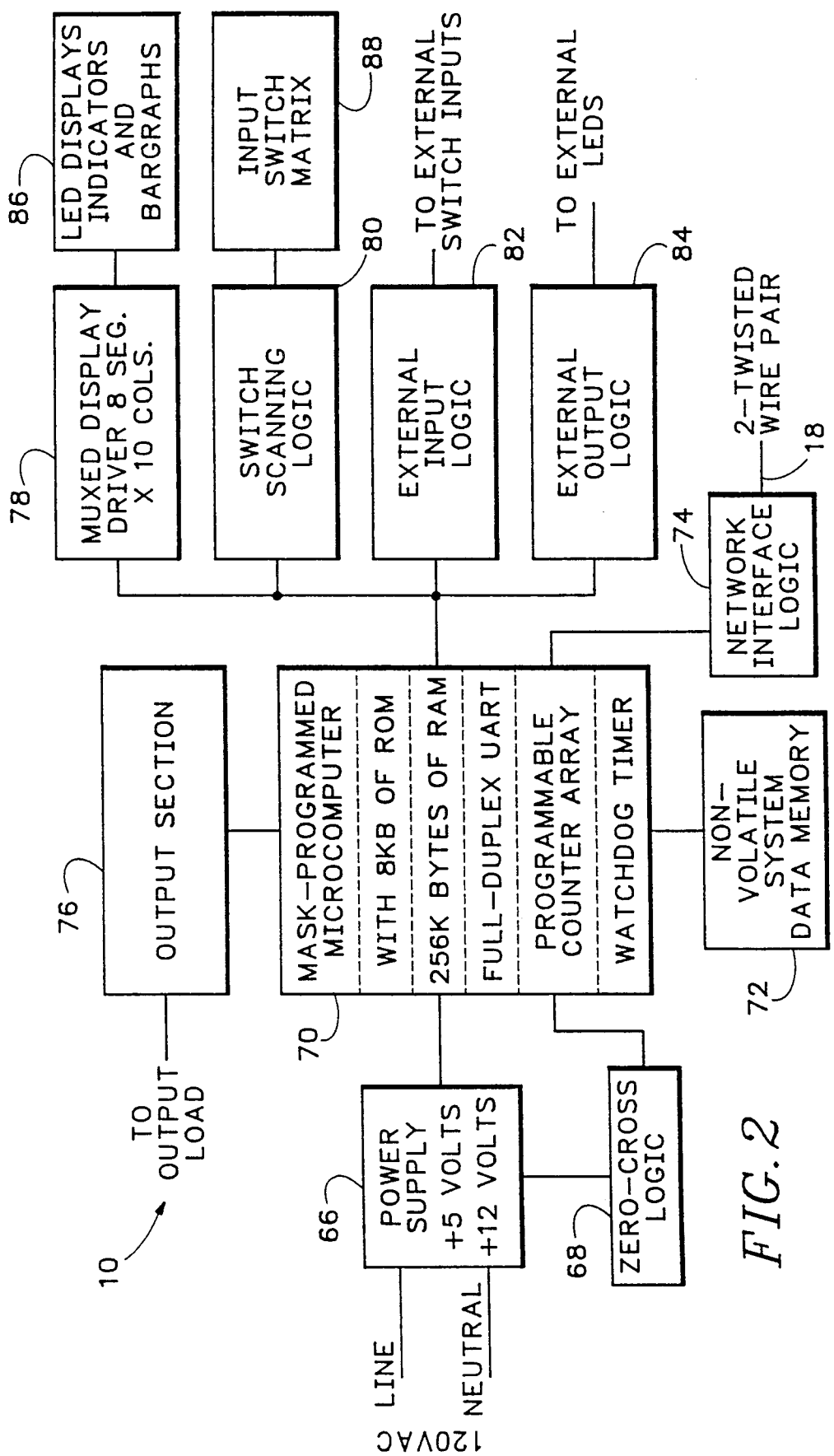
FIG. 2 is a block schematic diagram of one of the lighting control modules of FIG. 1.

Referring now to FIG. 2, each lighting control module such as module 10 is connected to a standard 120 volt AC line through a power supply 66 which is a conventional transformer, bridge rectifier with capacitive filter and integrated circuit voltage regulator. This unit provides DC power to all logic devices in the unit 10 and provides DC voltage to the local area network on a bus 18 to power the remote units. The power supply 66 is connected to a zero cross logic circuit 68 which detects the zero crossing of the power line voltage and generates a logic pulse to interrupt the master control unit (MCU) 20 each half cycle. This pulse is used to synchronize the MCU 70 with the power line in a way that is similar to the technique device disclosed in the aforementioned U.S. Pat. No. 4,649,323. Both the power supply 66 and the zero cross logic circuit 68 are connected to the master control unit 70. The MCU 70 includes eight kilobytes of ROM, 256 kilobytes of RAM, a full duplex serial port (UART), a programmable counter array, and a watchdog timer. The MCU controls all of the hardware in the system to generate the LED displays, scan and debounce the switch inputs, store and recall data in memory, control the external input and output ports and transmit and receive data over the LAN. The programmable counter array under control of the microcomputer generates pulse width modulated drive signals to an onboard dimmer section. The watchdog timer resets the MCU in the event of a failure. The MCU 70 is a mask-ROM programmed single chip Intel 83C51FA which is an enhanced version of an Intel 8051.

The MCU 70 is connected to an EEPROM 72 which stores all system setup, and current system state and lighting levels in a nonvolatile memory. The data from the MCU 70 is serial port data which is converted to a 250 KHz amplitude shift keyed (ASK) signal by network interface logic circuit 74. The output of the network interface logic circuit 74 is a two twisted wire pair which forms bus 18 to which all of the other lighting control modules and remote units are connected. The network interface logic circuit 74 also receives incoming tone bursts which are demodulated and converted back into a digital data stream which can be coupled to the serial port of MCU 70. This particular implementation for the local area network allows a party line "carrier sense, collision detect multiple access" data protocol to be implemented. The MCU 70 is responsible for all handling of network protocols and error recovery.

An output section 76 couples lighting control commands from the MCU 70 to the output loads which may comprise as many as 16 analog outputs designed to drive external high power lamp dimmers. Alternatively, the output section could consist of four optically isolated TRIAC stages.

Another output of MCU 70 is coupled to a multiplexed display driver 78, switch scanning logic 80, external input switch logic 82 and external output logic 84. The multiplexed display driver circuit consists of an eight segment high powered LED driver and a ten row power decoder. The MCU 70 loads the LED driver under software control and also generates time division multiplexing of the LED displays 86. As mentioned above, the LED displays comprise bar graphs 56 and 58 which are eight segment LEDs. The switch scanning logic circuit 80 is used to scan a four by ten (40 key) switch matrix 88 which comprises the front panel switches of module 10.

The external input logic circuit 82 and the external output logic circuit 84 are coupled to external switch inputs and LEDs (which may comprise a series of "dumb" remote switch inputs). These switch inputs are hard wired directly to the circuits 82 and 84 and are not connected to the local area network on bus 18. The switches 20, 22, 24 and 26 which are remote units coupled to the local area network, are "smart" switches which include a central processing unit which generates a unique digital ID code and digital command codes which are broadcast over the local area network each time a switch on one of these units is pressed. The transmission and reception of messages over the LAN will be explained below.

The MCU 70 includes a programmable microcomputer which may be programmed from the front panel of each lighting control module to implement various functions as desired by the user. For example, various presets may be programmed essentially as described in the aforementioned U.S. Pat. No. 4,733,138. In addition, special programming modes are available through which lighting control modules may be slaved to each other or to remote switches.

Figure 4:
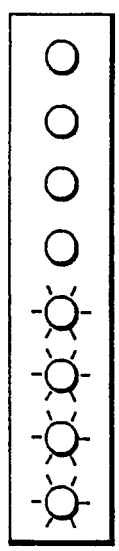
FIG. 4 is a front view of the RATE DISPLAY bar graph on the front of a lighting control module illustrating a lighting pattern indicating that the module has been placed into the unit ID set up mode.
Figure 3:
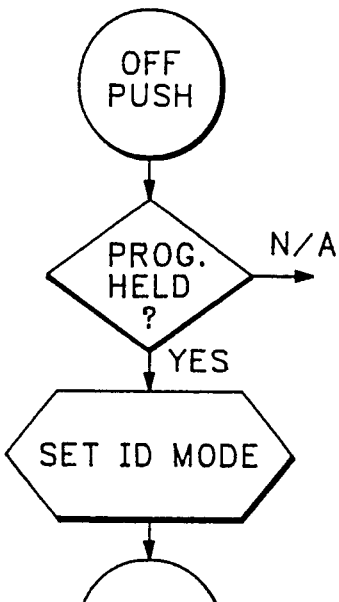
FIG. 3 is a flow chart illustrating a computer program used for establishing an identification code for a lighting control module.
Figure 5:
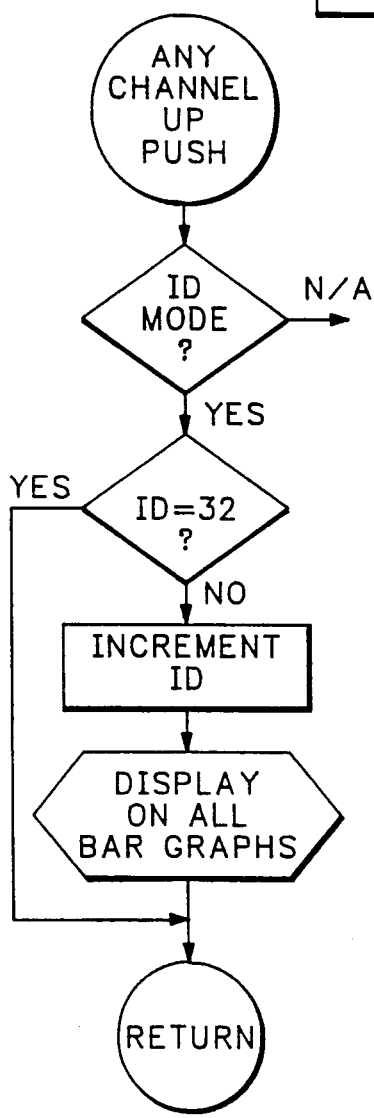
FIGS. 5-7 are flow chart diagrams illustrating portions of a computer program used in establishing a unit ID code during the unit ID set up mode.
Figure 6:
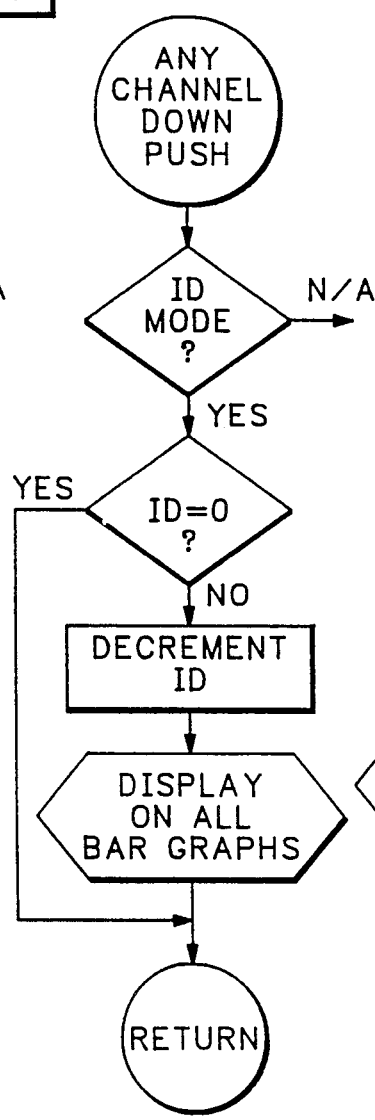
Figure 30:
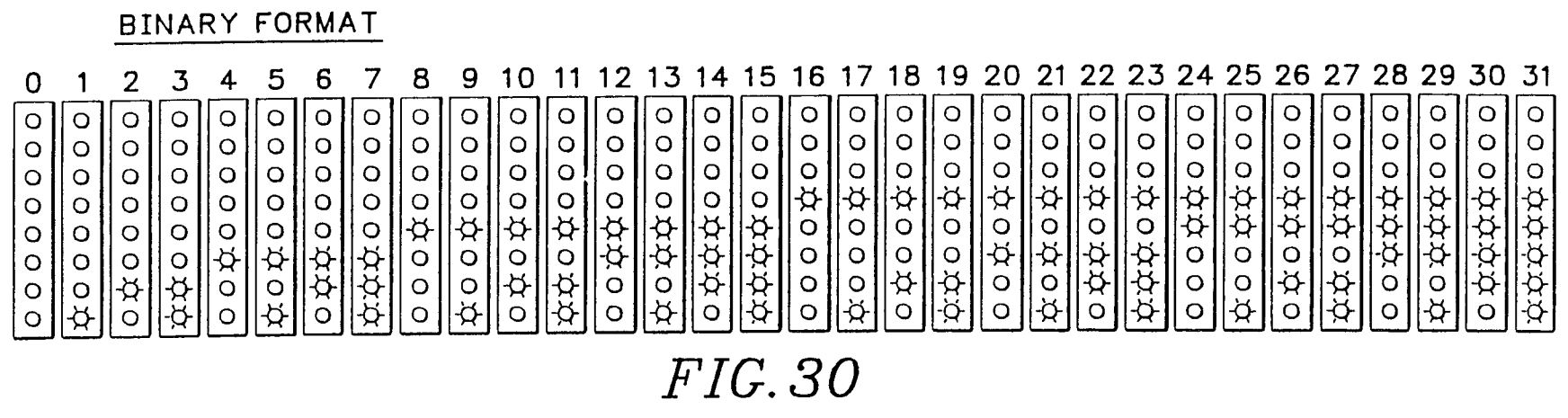

A unique feature of the system is that all control modules or switching units which are connected to the local area network generate a unique ID code each time any front panel function switch is depressed. The ID code must be established for each unit, however. FIGS. 3-7 illustrate how this is accomplished. In FIG. 3 when the OFF switch 30 is pushed and the PROGRAM switch 40 is held down, an ID mode is established on the MCU 70. The fact that the unit is in the ID setup mode is confirmed by the light pattern on the RATE DISPLAY bar graph 56 as illustrated in FIG. 4. This confirms to the user that the ID setup mode has been selected. Once the ID setup mode has been confirmed, an ID is chosen by pushing either the UP switch 52 or the DOWN switch 54 of any lighting channel. The bar graphs 58 of all of the lighting channels will increment in binary code either up or down as long as either the UP or DOWN buttons are held. The binary code format for the bar graphs is shown in FIG. 30. Thus, by simply pressing any channel UP or DOWN switch and waiting for the selected ID code to appear in binary code on the bar graphs 58, the user may select a unique ID code for that particular lighting control module. Codes between 1 and 31 may be selected. Code 0 is reserved for clearing all ID codes.

Figure 7:
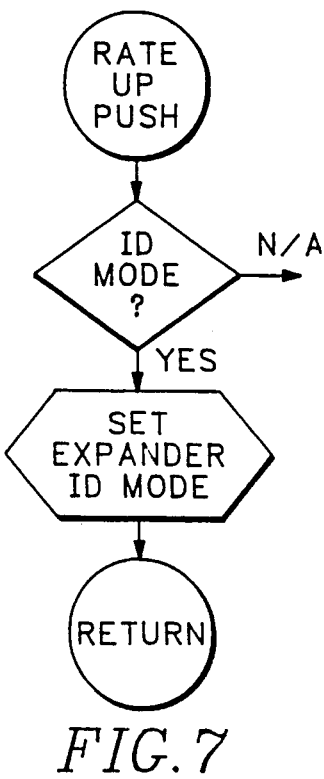
Figure 8:
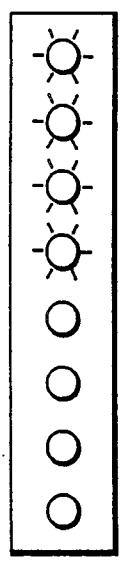
FIG. 8 is a front view of the RATE DISPLAY bar graph of a lighting control module illustrating a lighting pattern which indicates that the channel expander ID mode has been selected.
Figure 9:
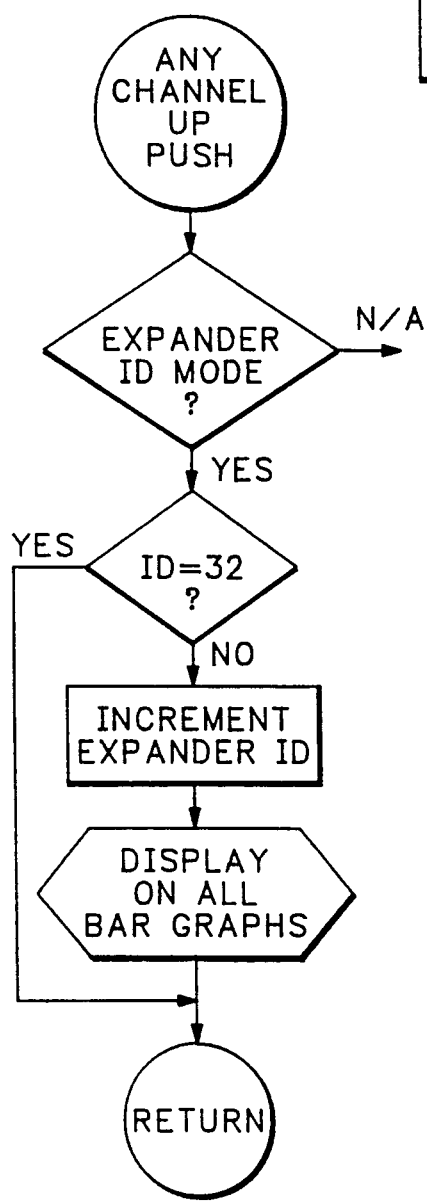
Figure 10:
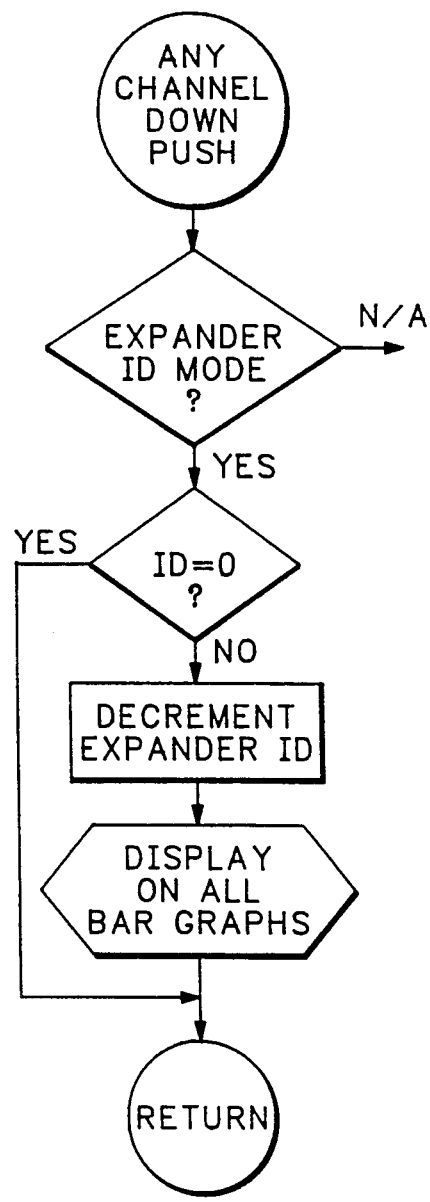

Referring to FIG. 7, if the unit is in the ID setup mode and the RATE UP switch 44 is depressed, the unit enters a channel expander ID mode. Once this mode has been entered the pattern shown in FIG. 8 flashes on the RATE DISPLAY bar graph 56. Thereafter as shown in FIGS. 9 or 10, pressing any channel UP or DOWN switch 52 or 54 will increment or decrement an expander ID number corresponding to another lighting control module which will be displayed on all channel bar graphs 58. The channel expander ID mode can be used to pair together two lighting control modules, such as modules 10 and 12, to double the number of lighting channels for a particular area. Once this mode has been selected, all function switches on either module will mimic each other except channel UP and channel DOWN switches 54 and 52. Thus pressing preset E switch 38 on lighting control module 10 will call up not only the E presets on that control module but will also call up the E presets on lighting control module 12 (if module 12 has been slaved to module 10 in this mode).

An important feature of the invention is the ability to slave any lighting channel of a lighting control module to a remote RAISE/LOWER switch such as switches 24 or 26. How this is accomplished is shown by the flow chart diagrams illustrated in FIGS. 12-15. Referring to FIG. 12, when the PROGRAM switch 40 is held on and any channel UP switch 52 is pressed, the lighting control module enters the LAN raise/lower setup mode. To confirm that this mode has been entered the user sees the light pattern illustrated in FIG. 16 appear on the RATE DISPLAY bar graph 56. Thereafter, as FIGS. 13 and 14 indicate, pressing any channel UP or DOWN increments a unique ID number which is displayed in the manner shown in FIG. 30 on that channel's bar graph. The number selected is the ID number of a particular raise/lower remote switch such as switch number 24. In such a case ID code number 7 would be chosen by cycling a particular channel switch until 7 was displayed on the channel's bar graph. At this point, as indicated in FIG. 15, the LEARN switch 42 is depressed. This automatically saves the ID code data in the system memory 72 and returns the front panel to a normal mode of operation exiting this particular programming mode. Thereafter that channel may be controlled from raise/lower remote switch 24.

Figure 18:
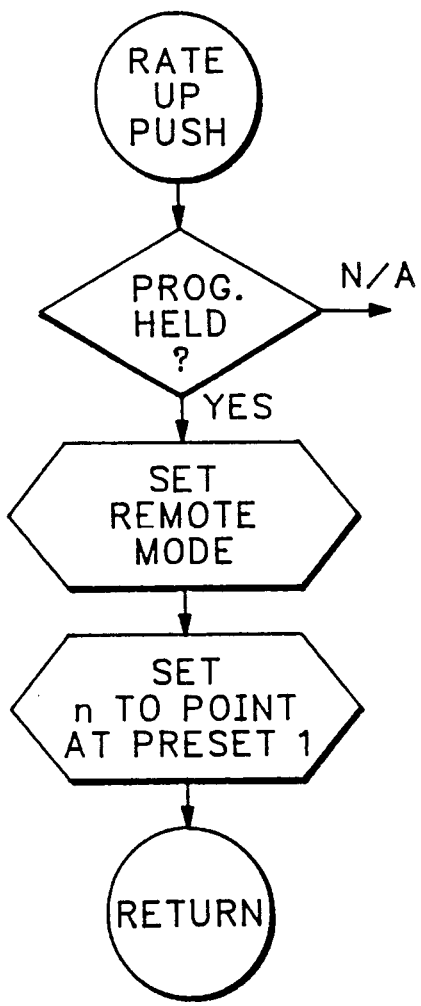
FIGS. 18-23 are flow chart diagrams illustrating a computer program utilized in the LAN preset setup mode.
Figure 19:
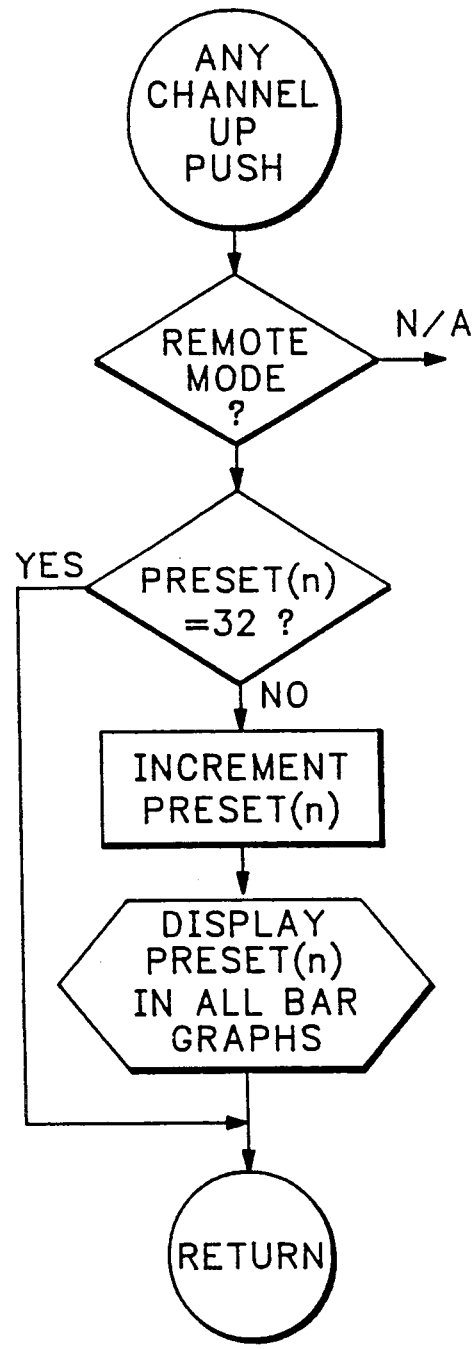
Figure 20:
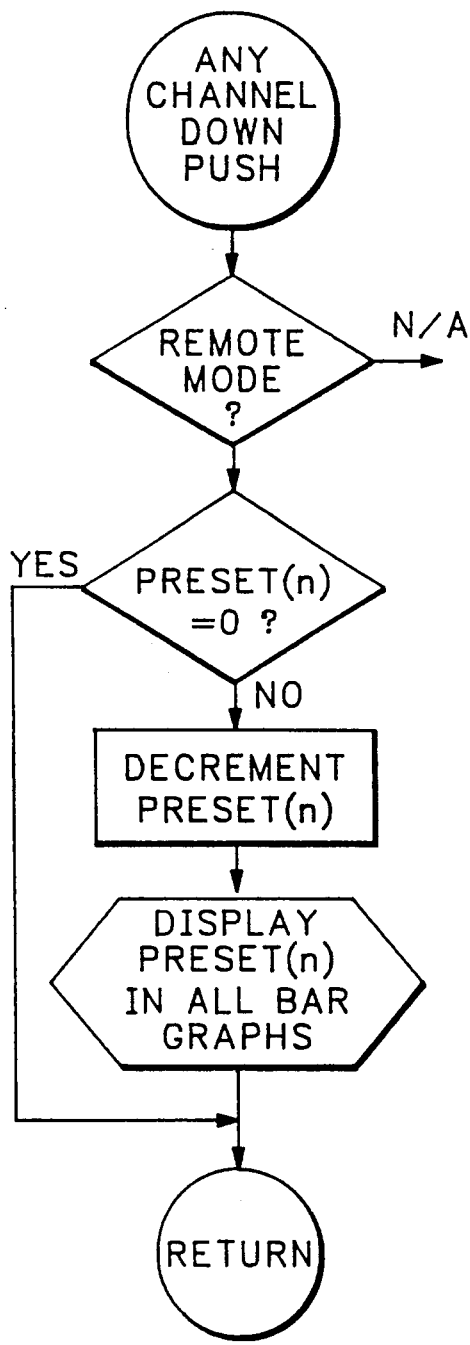
Figure 21:
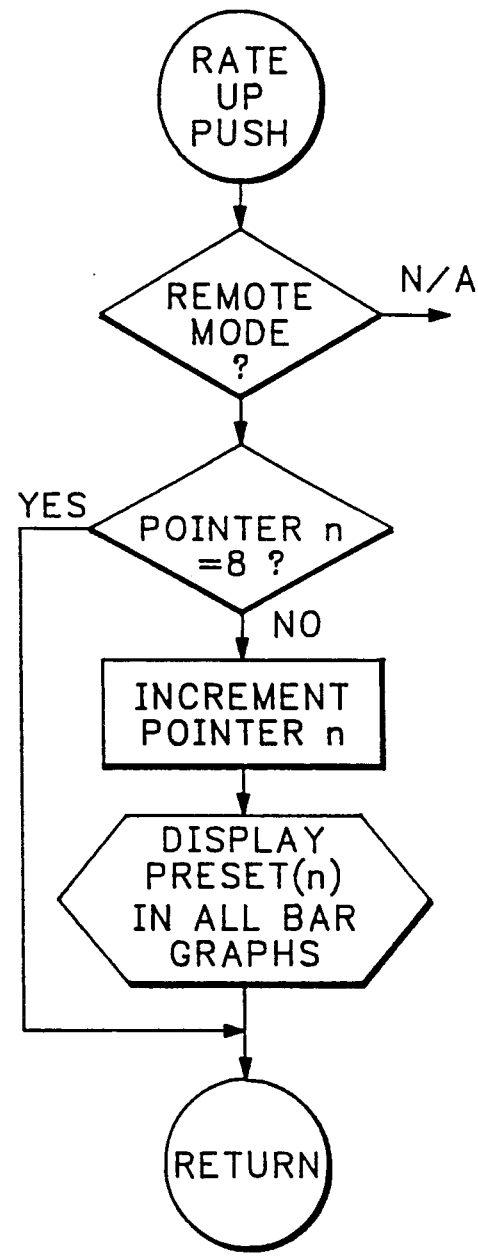
Figures 22, 23:
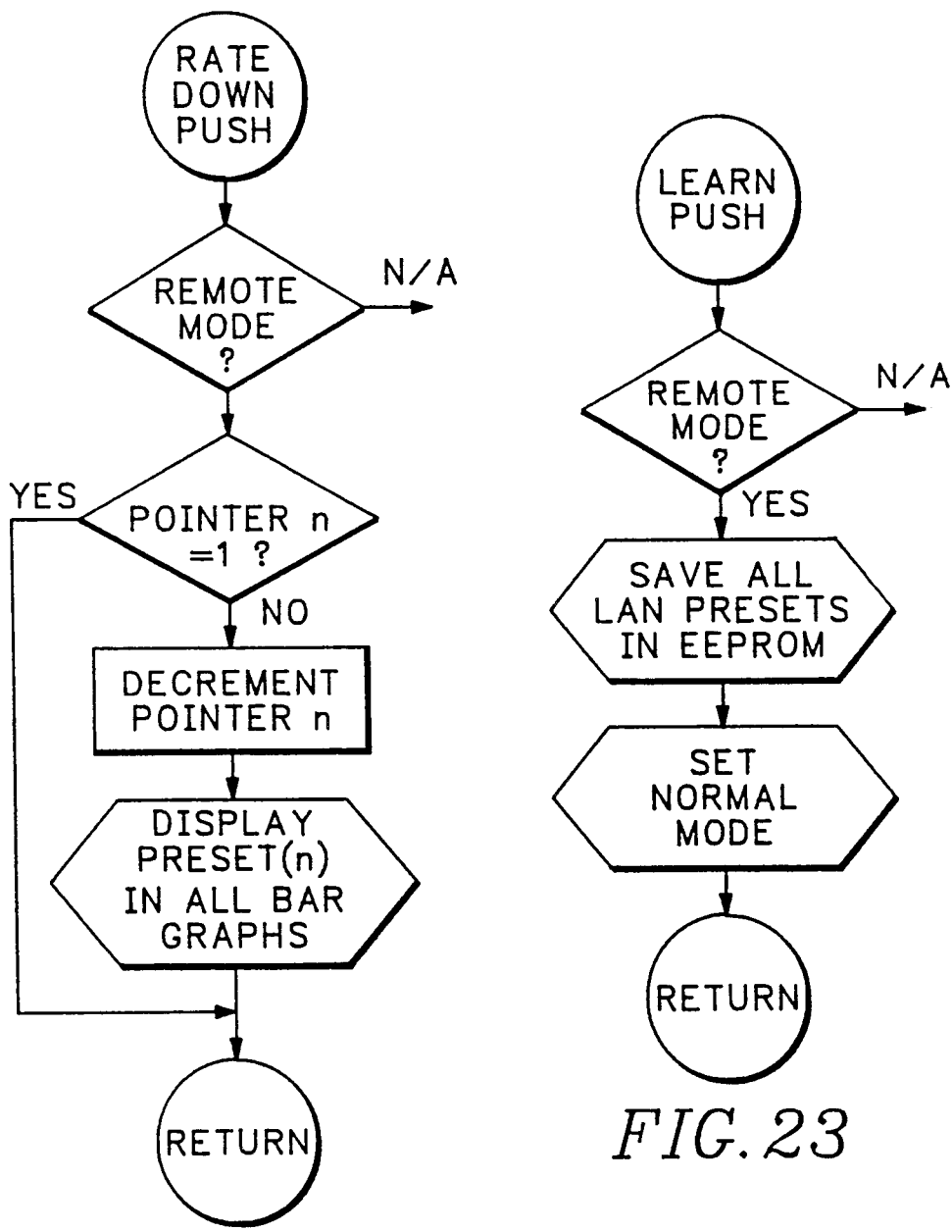

A local area network remote preset setup mode is illustrated in FIGS. 18-23. As illustrated in FIG. 18, this mode is entered whenever the RATE UP switch 44 is pressed while PROGRAM switch 40 is simultaneously held down. When this mode is entered, the RATE DISPLAY bar graph 56 displays a binary 1 as indicated in FIG. 17. As indicated in FIGS. 19 and 20, the ID code for any particular preset remote unit such as units 20 and 22 is selected by holding any channel UP or DOWN switch 52 or 54 respectively until the selected number appears in the channel bar graphs 58. As many as eight preset control units may be selected in this way. As indicated in FIGS. 21 and 22 pressing either the RATE UP or RATE DOWN switch will select another slot, so that an additional remote preset ID code can be chosen. The RATE DISPLAY graph 56 then shows the number of the slot chosen by the RATE UP or RATE DOWN switches 48 and 50. After choosing the desired slot, the channel switches may be used once again to select the ID code of a remote preset unit. As shown in FIG. 23, pressing the LEARN switch 42 saves all the LAN remote preset ID codes in memory and returns the front panel to its normal mode of operation.

D and E global preset modes are illustrated in FIGS. 25-28. When this mode is programmed, pressing any D or E preset on any lighting control module or on any remote preset unit will establish the D or E presets on all such programmed lighting control modules. Thus, this feature is intended to be used as a "whole house" preset.

Figure 28:
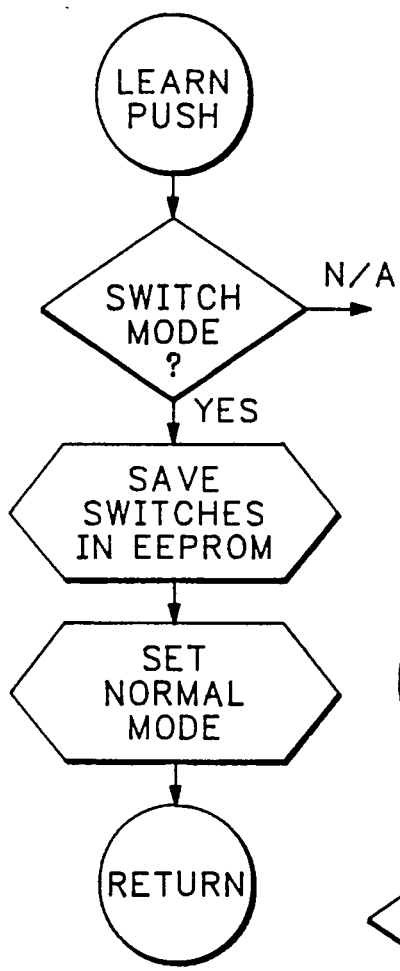
Figure 27:
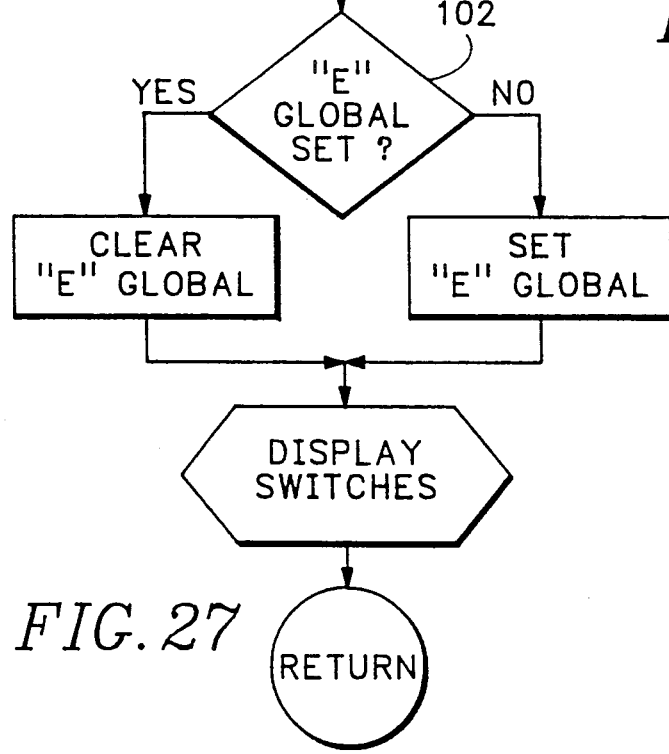

This mode, referred to as the SWITCH mode, is entered by pressing RATE DOWN switch 50 while holding PROGRAM switch 40 as shown in FIG. 25. FIGS. 26 and 27 illustrate the programming of the D an E global presets. If either preset D or E is pressed while in the SWITCH mode, the D or E global setup mode is either established or cleared as indicated at decision nodes 100 and 102. Thus, if D and/or E global modes have already been set, these modes may be cleared by entering the SWITCH mode and pressing the D or E preset button. Referring to FIG. 28, the mode is either established or cleared by pushing the LEARN switch 42. This saves the condition of the D and E presets in memory.

Figure 29:
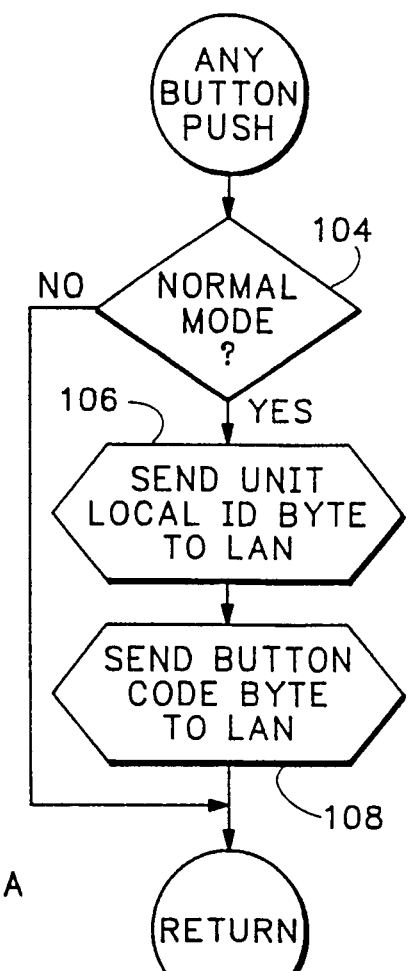
FIG. 29 is a flow chart diagram illustrating a computer program utilized in transmitting identification codes and command codes over a local area network.

Referring to FIG. 29, a flow chart illustrates transmission over the LAN by any of the lighting control modules 10, 12, 14 or 16, the preset remote units 20 and 22, or the raise/lower remote switches 24 or 26. Any time any button is pushed on any of these units, the MCU in each of the lighting control modules 10, 12, 14 or 16 determines whether or not that unit is in a normal mode or in a programming mode as indicated at decision node 104. When the module is in a normal mode, the ID code of the unit that is associated with that particular button transmits a byte corresponding to its ID code to all other units on the local area network as indicated at 106. Just behind the byte indicating the ID code is a command code indicated at 108 that is unique to the function of the particular button that has been pressed. Thus, if lighting control module 10 has been programmed to respond to preset A on remote preset unit 20, depressing the one of the switches 60 that corresponds to preset A on unit 20 will generate an ID code indicating that unit number 5 is transmitting, and will then generate a function code identifying preset A. When the program switch 40 has been depressed on any of the lighting control modules, however, the unit is not in a normal mode but is in a special programming mode. In this case, as the decision node 104 indicates, the unit ID code and the function code are not transmitted over the LAN.

Figure 31:
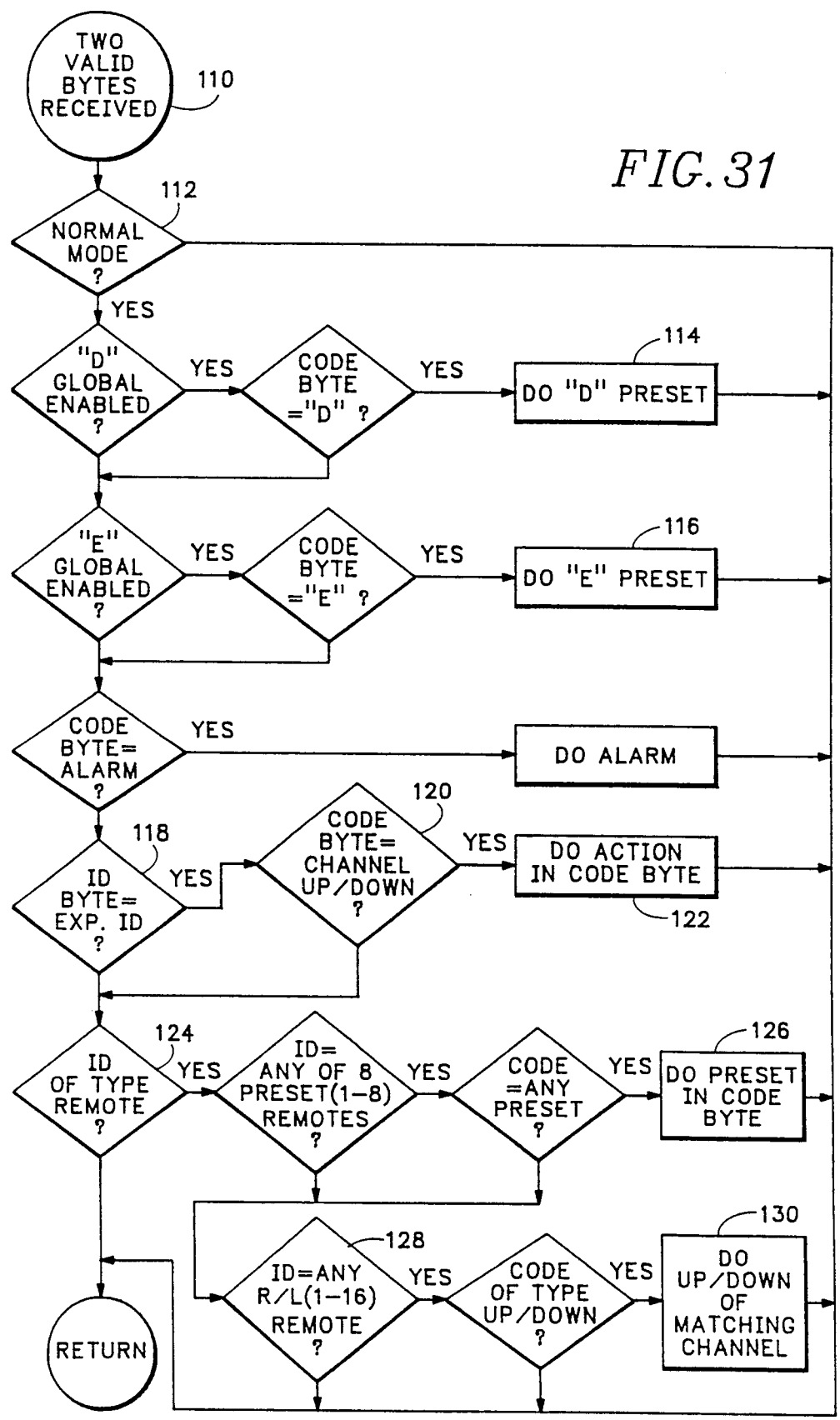
FIG. 31 is a flow chart diagram illustrating a computer program utilized in receiving data over a local area network.

Local area network reception is illustrated in FIG. 31. Only the lighting control modules 10, 12, 14 and 16 receive commands over the LAN. First, the MCU determines if two valid bytes of data have been received as indicated at 110. Decision node 112 determines if the lighting control module is in a normal mode. If yes, both the function code byte and the ID code byte are examined and the MCU takes the appropriate action. For example, if the ID byte is valid and either D global or E global has been enabled the local MCU institutes a fade to either the D or E preset as indicated at blocks 114 and 116. Whenever the code byte corresponds to a function entitled "ALARM," the MCU of each lighting control module so programmed performs an ALARM function which may, for example, be to rapidly flash all of the lights in the house on and off.

If the ID byte at block 118 is the ID code of a lighting control module that was added in the channel ID expander mode and the function code block 120 is a raise or lower command, then the local MCU raises or lowers the appropriate channel as indicated at block 122. Referring to decision node 124, if the ID code indicates either of the remote type of switches 20 and 22 or 24 and 26, the local MCU first determines if the ID code corresponds to one of the preset remote units 20 or 22 and performs the appropriate function as indicated at 126. If the ID code comes from one of the raise/lower remote switches 24 or indicated at decision node 128 the local MCU will take the appropriate action to raise or lower selected channels as programmed at block 130.

Numerous other functions can be implemented with the hardware configuration of the lighting control modules 10, 12, 14 and 16. For example, the function switches on each control module may be reprogrammed to permit the module to be inverted (turned upside down) in case the module must be located on a particular side of a doorway due to space limitations. In this mode the raise/lower command switches are all inverted so that pressing the uppermost switch on the inverted panel raises lighting levels and the lower switch lowers them. Also, particular lighting channels on each of the lighting control modules may be excluded from preset control commands. Thus a reading lamp could be programmed to remain independent of any of the preset commands. Other features such as dimming, fading and the setup of selected channels for fluorescent operation may also be made available for each of the lighting control modules and implemented as disclosed in the aforementioned U.S. Pat. Nos. 4,733,138 and 4,649,323.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A lighting control system comprising:
   (a) a plurality of lighting control modules, each said module having
      (i) function switches for generating command signals to control light intensity levels,
      (ii) a plurality of lighting channels responsive to the command signals,
      (iii) a programmable central processing unit for transmitting the command signals and for generating an ID (identification) code indicating a unique identity;
   (b) local area network means for interconnecting said plurality of lighting control modules and for carrying the ID code and command signals; and
   (c) programming means associated with each of said lighting control modules for selecting predetermined ID codes whereby command signals generated by selected ones of said control modules may be executed by other ones of said control modules.

2. The lighting control system of claim 1 further including remote switch means coupled to said local area network means for generating lighting level command signals and a digital code, said remote switch means controlling lighting levels on control modules which are programmed to accept said command signals from said remote switch means having predetermined digital codes.

3. The lighting control system of claim 2 wherein said remote switch means comprises at least one preset remote unit having function switches for controlling lighting levels on a plurality of lighting channels simultaneously.

4. The lighting control system of claim 3 wherein said remote switch means comprises at least one raise/lower remote switch for generating a raise/lower lighting level command signal.

5. The lighting control system of claim 1 wherein said programming means comprises a switch located on each of said lighting control modules for placing each module in a programming mode whereby said function switches are transformed to execute preselected programming functions for said central processing units.

6. The lighting control system of claim 1 wherein each of said modules includes visual means for indicating the intensity of light on each of said lighting channels and whereby said visual means provides visual verification for said preselected programming functions while said modules are in said programming mode.

7. In a lighting system controlled by microcomputer apparatus for programming the computer from a use-raccessible panel to control lighting level functions on a plurality of channels comprising:
   (a) a plurality of light function switches having normally designated lighting control functions;
   (b) programming control means for placing the microcomputer in a program mode and for assigning programming functions to said lighting function switches different from said normally designated lighting control functions whenever predetermined ones of said function switches are depressed simultaneously with said programming control means placing the microcomputer in said program mode; and
   (c) learn control means for locking into a memory the programming function selected by the simultaneous depression of the programming control means and the selected lighting function switch.

8. The lighting system of claim 7 further including visual indicator means for normally indicating lighting intensity levels and responsive to said programming means for providing a visual code indicating a particular programming function.

* * * * *

UNITED STATES PATENT AND TRADEMARK OFFICE
CERTIFICATE OF CORRECTION

PATENT NO. : 5,059,871
DATED : October 22, 1991
INVENTOR(S) : Gordon Pearlman et al It is certified that error appears in the above-indentified patent and that said Letters Patent is hereby corrected as shown below:

Col. 1, Line 21: add --t-- to word microcomputer

Col. 1, Line 26: delete "Pat. Nos." add --patents--

Col. 2, Line 57: to the word ar add --e--

Col. 4, Line 5: after 20 and delete "2" and add --22--

Col. 8, Line 66: after switches 24 or add --26--

Signed and Sealed this

Fourteenth Day of September, 1993

*Attest:*

BRUCE LEHMAN

*Attesting Officer*    Commissioner of Patents and Trademarks